US 8,830,251 B2

(12) United States Patent
Jain et al.

(10) Patent No.: US 8,830,251 B2
(45) Date of Patent: Sep. 9, 2014

(54) METHOD AND SYSTEM FOR CREATING AN IMAGE

(75) Inventors: Gaurav Kumar Jain, Bangalore (IN); Girish Kulkarni, Bangalore (IN); Bela Anand, Bangalore (IN); Praveen Saxena, Bangalore (IN)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 467 days.

(21) Appl. No.: 12/842,148

(22) Filed: Jul. 23, 2010

(65) Prior Publication Data

US 2011/0025701 A1 Feb. 3, 2011

(30) Foreign Application Priority Data

Jul. 23, 2009 (IN) .......................... 1740/CHE/2009
Apr. 21, 2010 (KR) ........................ 10-2010-0037097

(51) Int. Cl.
*G09G 5/02* (2006.01)

(52) U.S. Cl.
USPC .......................................... 345/589; 345/629

(58) Field of Classification Search
None
See application file for complete search history.

(56) References Cited

U.S. PATENT DOCUMENTS

| | | | | | |
|---|---|---|---|---|---|
| 5,469,536 | A | * | 11/1995 | Blank ............................ | 345/594 |
| 5,687,306 | A | | 11/1997 | Blank ............................ | 395/135 |
| 5,815,645 | A | * | 9/1998 | Fredlund et al. ............. | 358/1.18 |
| 5,850,471 | A | * | 12/1998 | Brett ............................. | 382/162 |
| 5,953,076 | A | * | 9/1999 | Astle et al. .................... | 348/584 |
| 6,057,850 | A | * | 5/2000 | Kichury ........................ | 345/584 |
| 6,285,468 | B1 | * | 9/2001 | Cok et al. ..................... | 358/450 |
| 6,775,407 | B1 | * | 8/2004 | Gindele et al. ............... | 382/166 |
| 6,909,438 | B1 | | 6/2005 | White et al. .................. | 345/629 |
| 7,171,057 | B1 | * | 1/2007 | Wilensky et al. ............. | 382/284 |
| 7,200,281 | B2 | * | 4/2007 | Zhang et al. ................. | 382/276 |
| 7,301,666 | B2 | * | 11/2007 | Ohta et al. .................... | 358/1.18 |
| 7,454,085 | B2 | * | 11/2008 | Cazier et al. ................. | 382/282 |
| 7,817,875 | B2 | * | 10/2010 | Michel et al. ................ | 382/274 |
| 8,094,170 | B2 | * | 1/2012 | Kato et al. .................... | 345/647 |
| 2004/0095474 | A1 | * | 5/2004 | Matsufune ................ | 348/220.1 |
| 2005/0019796 | A1 | * | 1/2005 | Meiring et al. .................. | 435/6 |

(Continued)

FOREIGN PATENT DOCUMENTS

| | | |
|---|---|---|
| CN | 1704883 A | 12/2005 |
| CN | 1745386 A | 3/2006 |

(Continued)

OTHER PUBLICATIONS

Ying Shan, Zicheng Liu, and Zhengyou Zhang, "Image-Based Surface Detail Transfer", Computer Vision and Pattern Recognition, 2001. CVPR 2001, Proceedings of the 2001 IEEE Computer Society Conference, pp. II-794-II-799 vol. 2 (2001). Also available at http://research.microsoft.com/en-us/um/people/zliu/aging.pdf.*

(Continued)

*Primary Examiner* — Kee M Tung
*Assistant Examiner* — William Beutel
(74) *Attorney, Agent, or Firm* — Cha & Reiter, LLC (57) ABSTRACT

A method for combining at least two images and outputting a combined image includes creating a template including a first input image having a defined area, receiving a second input image, modifying the second input image by applying an intensity relating to a plurality of pixels included in the defined area to a plurality of pixels included in the second input image and replacing the defined area with the modified second image to create an output image and displaying the output image.

23 Claims, 8 Drawing Sheets

(56) References Cited

U.S. PATENT DOCUMENTS

| | | |
|---|---|---|
| 2005/0069223 A1 | 3/2005 | Tanimura et al. |
| 2005/0093890 A1 | 5/2005 | Baudisch |
| 2005/0203724 A1* | 9/2005 | Orpaz et al. .................. 703/6 |
| 2006/0098112 A1 | 5/2006 | Kelly |
| 2008/0198175 A1* | 8/2008 | Sun et al. .................. 345/629 |
| 2009/0066718 A1* | 3/2009 | Russell et al. ............... 345/595 |
| 2009/0103801 A1* | 4/2009 | Messler .................... 382/163 |
| 2010/0194776 A1* | 8/2010 | Chong et al. ................ 345/594 |
| 2012/0139912 A1* | 6/2012 | Sandige et al. .............. 345/419 |

FOREIGN PATENT DOCUMENTS

| | | | |
|---|---|---|---|
| CN | 101053248 A | 10/2007 | |
| EP | 0853426 | 7/1998 | ............ H04N 5/262 |
| JP | 3761169 | 1/2006 | ............ H04N 5/232 |
| KR | 20-0410855 | 3/2006 | ............ H04N 5/262 |

\* cited by examiner

METHOD AND SYSTEM FOR CREATING AN IMAGE

CLAIM OF PRIORITY

This application claims priority under 35 U.S.C. §119(a) from an application entitled: "Method And System For Creating A Template And An Image," filed in the Indian Patent Office on Jul. 23, 2009, and accorded Serial No. 1740/CHE/2009, and an application entitled: "Method And System For Creating An Image," filed in the Korean Intellectual Property Office on Apr. 21, 2010, and accorded Serial No. 10-2010-0037097, the contents of which are hereby incorporated by reference.

BACKGROUND OF THE INVENTION

1. Field of the Invention

The present invention relates to a method and a system for creating an image, and relates more particularly to a method and a system for combining at least two images and outputting a combined image.

2. Description of the Related Art

Often in multimedia devices, for example, in mobile phones, one or more images are captured and viewed. To enhance a better image viewing experience for a multimedia device user, various imaging techniques are known by which an image can be presented as a part of another image, for example, an image can be viewed within a frame of another image. Some techniques exist wherein a foreground image is merged with a background image and the merged image is presented to the user. Other techniques exist wherein a particular region contained within an image is selected and another image is captured within the selected region, merged and presented. However, the existing techniques do not provide the user with realistic effects. For example, if a user desires his photo to be presented on an historical monument, realistic effects may not be achieved by existing techniques. Further, existing techniques store information corresponding to the merge area and image editing effects separately, resulting in an increase in storage space. For that matter, using existing techniques results in an increase in processing time as the existing techniques need to apply image editing effects to the image after the merge.

In light of the foregoing discussion, there is a need for an efficient multimedia device imaging technique that overcomes one or more of the above stated shortcomings of existing techniques.

SUMMARY OF THE INVENTION

Accordingly, the present invention provides a method and a system for combining at least two images and outputting a combined image which overcome various problems and shortcomings in known multimedia devices and imaging techniques used therein.

In accordance with an aspect of the invention, a method of creating an image operable in a processor in an electronic device includes steps of: creating a template including a first input image having at least one defined area; receiving a second input image; modifying the second input image by applying an intensity relating to a plurality of pixels included in said at least one defined area to a plurality of pixels included in the second input image, and replacing said at least one defined area with the modified second image to create an output image; and displaying the output image.

In accordance with another aspect of the invention, a method of creating an image operable in a processor in an electronic device includes steps of: computing at least one defined area from a first input image; receiving a second input image; modifying the second input image by applying an intensity relating to a plurality of pixels included in said at least one defined area to a plurality of pixels included in the second input image, and replacing said at least one defined area with the modified second image to create an output image; and displaying the output image.

In accordance with another aspect of the present invention, a system for creating an image is provided including: a defining unit for defining at least one defined area in the first input image; a determining unit for determining an intensity relating to a first pixel from among the plurality of pixels included in said at least one defined area; an applying unit for applying the intensity relating to the first pixel to a corresponding pixel of a second input image and computing a modified second input image pixel; a replacing unit for replacing the first pixel with the modified second input image pixel in said at least one defined area; and a processor for controlling the determining unit, the applying unit and the replacing unit to repeatedly identify and perform the respective identifying, determining, applying and replacing of each of the plurality of pixels included in said at least one defined area to create an output image.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

It should be observed that method steps and system components are represented by conventional symbols in the figures herein, which figures show only specific details relevant for an understanding of the present disclosure. Details that are understood to be readily apparent to a person of ordinary skill in the art are not shown in any detail. For that matter, relational terms such as first and second and the like may be used to distinguish one entity from another entity without necessarily implying any actual relationship or order between such entities.

The present disclosure describes various method and system embodiments for creating a template and an image.

Figure 1:
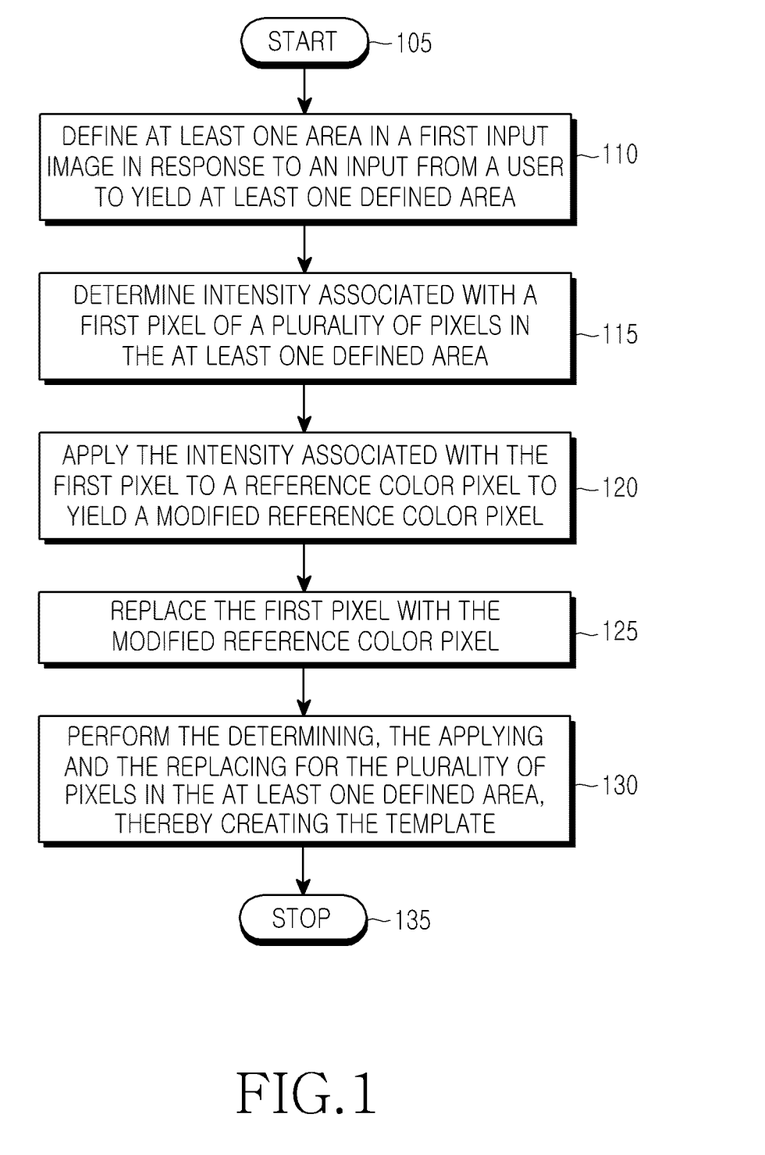
FIG. 1 is a flowchart illustrating a method for creating a template, in accordance with one embodiment of the invention.

FIG. 1 is a flowchart illustrating a method for creating a template, in accordance with one embodiment of the invention.

At step 110, a defining unit 480 (FIG. 4) defines at least one area in an input image in response to an input from a user. A user having a multimedia device, for example, a mobile phone, can open an image stored in the mobile phone and switch on template creation application. The image can be referred to as a first input image.

The first input image, however, is not limited to a stored in a mobile phone but can any other image, or first input image, for example, an image captured by a camera. The first input image can either be in compressed format or non-compressed format.

Several areas can then be defined in the first input image in response to an input from a user. The input from the user can include a selection made using a stylus. In some embodiments, an interface is provided to the user in which the user can input the details.

The areas can be of any shape and size. An area defining tool is provided for defining the areas. The defined areas are referred to as at least one defined area.

In some embodiments, if the defined area is of any arbitrary shape, then a standard boundary, for example, a rectangle, can be considered for processing the area further.

Steps 115, 120 and 125 are performed for each defined area. A processor 410 (FIG. 4) performs steps 115, 120 and 125 by controlling a determining unit 460 (FIG. 4), the applying unit, and the replacing unit.

In some embodiments, steps 115, 120 and 125 are performed for each pixel in the defined area. The defined area can include a plurality of pixels. Steps 115, 120 and 125 for processing a first pixel from among the plurality of pixels in the defined area are explained in greater below.

At step 115, the determining unit 460 determines an intensity associated with a first pixel.

As a first scheme for determining the intensity associated with the first pixel, the determining unit 460 computes a mean intensity of the pixels in the area.

$$\text{Mean Intensity } (Im) = \frac{P1 + P2 + P3 + \ldots + PN}{N}$$

Then, the determining unit 460 computes a difference in the intensity of the first pixel and the mean intensity, and determines the difference as the intensity associated with the first pixel.

As a second scheme for determining the intensity associated with the first pixel, the determining unit 460 computes a difference between the intensity of the first pixel and an intensity of a corresponding reference color pixel. The difference is defined as the intensity associated with the first pixel.

The reference color pixel is defined as the first pixel having the reference color. The reference color is selected by the user or is predefined.

After the intensity associated with the first pixel is determined in step 115, an applying unit 465 (FIG. 4) applies the intensity associated with the first pixel to the reference color pixel to yield a modified reference color pixel at step 120. The applying at step 120 includes varying at least one of intensity, saturation, color and chroma components. The applying is performed based on needs and requirements of the user.

Various options for the applying step are available to the user, and various techniques of applying can be used. A few exemplary techniques are given below.

When a hue saturation value (HSV) color model is provided according to the first scheme, the values of the reference color pixel are represented as HR, SR, VR and the values of the first pixel are represented as H1, S1, V1. In this case, H1 and HR are equal, SR and S1 are equal and hence the intensity associated with the first pixel can be added to VR. For example, if the mean intensity is "Im", the intensity associated with the first pixel is (Im-P1), which is added to VR to make it equal to V1.

When a red green blue (RGB) color model is used according to the second scheme, the difference between the intensity IR of the reference color pixel and the P1 is determined as the intensity associated with the first pixel. Then, P1−IR can be distributed across the RGB color model of the reference color using several distribution ratios. The distribution ratios are selected in a way that each value under each color is between MIN and MAX, for example, each value under each color is defined between 0 and 255 in an 8 bit R, G and B color model. Exemplary equations for distribution are given below:

$$Rc\cdot\text{RED} = Rc\cdot\text{RED} + (P1-IR)*C1;$$

$$Rc\cdot\text{GREEN} = Rc\cdot\text{GREEN} + (P1-IR)*C2;$$

$$Rc\cdot\text{BLUE} = Rc\cdot\text{BLUE} + (P1-IR)*C3;$$

where C1, C2 and C3 are real numbers, Rc is the reference color and where MIN=0 and MAX=255 for an 8 bit R, G and B.

In the same manner, various other color models, for example, a YUV color model can also be used.

When the reference color pixel is modified by applying the intensity associated with the first pixel to the reference color pixel at step 120, a replacing unit 470 (FIG. 4) replaces the first pixel with the modified reference color pixel, at step 125.

After replacing the first pixel with the modified reference color pixel, the processor 410 performs steps 115, 120 and 125 for each of the plurality of pixels included in the defined area at step 130, replacing each of the plurality of pixels with a corresponding modified reference color pixel.

When the plurality of pixels included in the defined area have been completely replaced at step 130, the processor 410 generates a template and stores the template in the memory 415 (FIG. 4), which template can be previewed for a user's viewing before storing.

When the template is stored, the reference color and information associated with the reference color and each defined area are stored in the memory 415. The information is stored in a format such as an exemplary format is illustrated in Table 1 and Table 2 below:

TABLE 1

| Starting X | Starting Y | Reference Color | Is Mirror | Width | Height |
|---|---|---|---|---|---|
| X coordinate from a reference point | Y coordinate from the reference point | Color to be substituted | Is template mirror template | Width of at least one defined area | Height of the at least one defined area |

TABLE 2

| No. of areas | Max. width | Max height |
|---|---|---|
| No. of areas in the input image | Maximum width between plurality of clips | Maximum height between plurality of clips |

Further, edge pixels in the defined area are determined. One or more edge detection algorithms are used for detecting the edges in the at least one defined area.

The determined edge pixels in the defined area are preserved without performing step 115 to step 130, or intensities of the determined edge pixels are be mapped to the reference color.

Further, the presence of mirroring in the defined area is determined. The mirroring information associated with the at least one defined area is also stored in the memory 415.

Also, the defined area can be modified, for example, rotated. The defined area including rotation can then be saved as the template. The template including the defined area helps in reducing processing time when the template is used in future.

Figure 2:
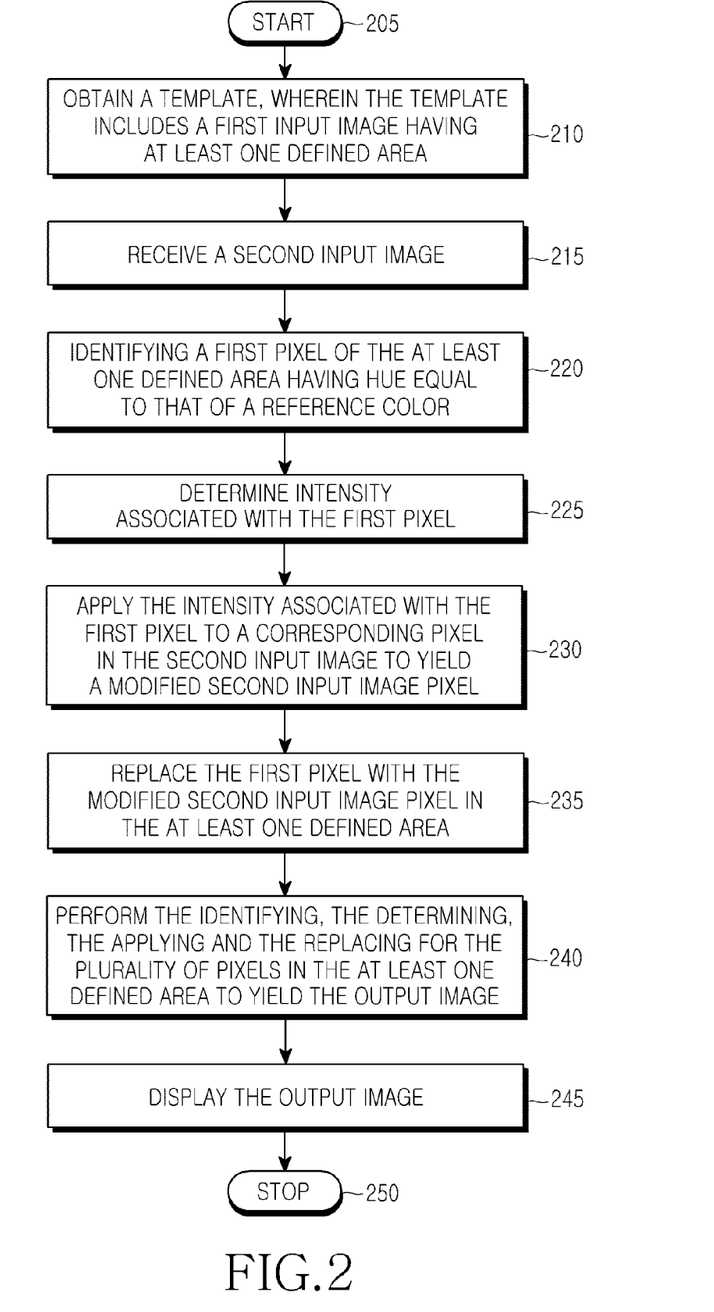
FIG. 2 is a flowchart illustrating a method for creating an output image, in accordance with one embodiment of the invention.

FIG. 2 is a flowchart illustrating a method for creating an output image, in accordance with one embodiment of the present invention.

At step 210, the processor 410 obtains a template having at least one defined area, which is created through the process shown in FIG. 1. The template includes a first input image having the at least one defined area. The template is obtained from a storage device, or online or using any other transfer technique, for example Bluetooth, Infrared and others, without limitation.

At step 215, the processor 410 receives a second input image. The second input image can be a real time image, a captured image, or a stored image. The second input image can also be a compressed image or a non-compressed image. The real time image can be received from a real time source capable of obtaining the real time image. The real time source can include a camera or a remote device capable of sending the image.

Further, receiving the second input image includes performing at least one of resizing the second input image, cropping the second input image and repositioning the second input image. The resizing, the cropping and the repositioning of the second input image is performed using various algorithms. For example, the defined area can have a size smaller than the second input image. In such a scenario, a central region or any other region of the second input image is selected and altered while maintaining the aspect ratio.

Figure 4:
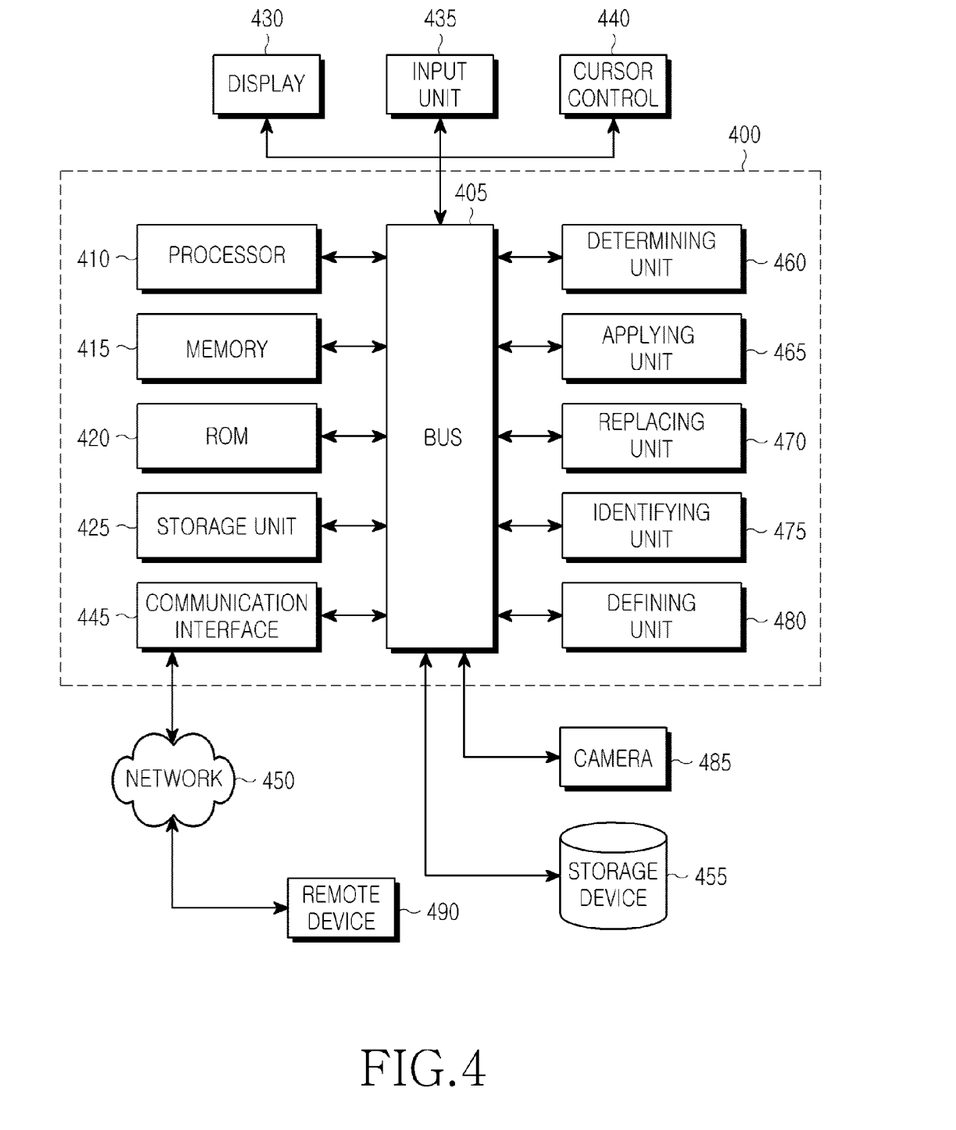
FIG. 4 is a block diagram of an electronic device for creating a template and an image, in accordance with one embodiment of the invention.

Steps 220, 225, 230, 235 and 240 are performed for each defined area. The processor 410 performs steps 220, 225, 230, 235 and 240 by controlling the identifying unit 475, the determining unit 460, the applying unit 465, and the replacing unit 470 (FIG. 4).

In an embodiment of the present invention, steps 220, 225, 230, 235 and 240 are performed for each pixel in the defined area. The defined area can include the plurality of pixels.

Steps 220, 225, 230, 235 and 240 for a first pixel of the plurality of pixels of the defined area are explained in greater detail below.

At step 220, the identifying unit 475 (FIG. 4) identifies a first pixel of the at least one defined area having a hue equal to that of a reference color. This helps in eliminating the pixels that are covered in a rectangular area surrounding an actual selected area but not in the actual selected area. For example, when the actual selected area is a circle, a rectangular area enclosing the circle is the defined area.

At step 225, the determining unit 460 determines the intensity associated with the first pixel.

As a first scheme for determining the intensity associated with the first pixel, the determining unit 460 computes a mean intensity of the pixels in the area.

$$\text{Mean Intensity } (Im) = \frac{P1 + P2 + P3 + \ldots + PN}{N}$$

Then, the determining unit 460 computes a difference in the intensity of the first pixel and the mean intensity, and defines the difference as the intensity associated with the first pixel.

As a second scheme for determining the intensity associated with the first pixel, the determining unit 460 computes a difference between the intensity of the first pixel and an intensity of a corresponding pixel of the second input image, and defines the difference as the intensity associated with the first pixel. The corresponding pixel is defined as a pixel of the second input image that is intended to be inserted at the place of the first pixel.

After the intensity associated with the first pixel is determined in step 225, the applying unit 465 applies the intensity associated with the first pixel to the corresponding pixel of the second input image to yield a modified second input image pixel at step 230. The applying at step 230 includes varying at least one of intensity, saturation, color and chroma components. The applying is performed based on the needs and requirements of the user.

Various options for the applying step are available to the user, and various techniques of applying can be used. A few exemplary techniques are given below.

When a hue saturation value (HSV) color model is provided according to the first scheme, the values of the corresponding pixel of the second input image are represented as HC, SC, VC and the values of the first pixel are represented as H1, S1, V1. In this case, H1 and HC are equal, SC and S1 are equal and the intensity associated with the first pixel is added to VC. For example, if the mean intensity is "Im", the intensity associated with the first pixel is (Im-P1) is added to VC to make it equal to V1.

When a red green blue (RGB) color model is used according to the second scheme, the difference between the intensity IC of the corresponding pixel of the second input image and the first pixel P1 is determined as the intensity associated with the first pixel. Then, P1–IC is distributed across the RGB color model of the reference color using several distribution ratios. The distribution ratios are selected in a way that each value under each color is between MIN and MAX, for example, each value under each color is between 0 and 255 in an 8 bit R, G and B color model. Exemplary equations for distribution are given below:

$$Rc\text{-RED}=Rc\text{-RED}+(P1-IR)*C1;$$

$$Rc\text{-GREEN}=Rc\text{-GREEN}+(P1-IR)*C2;$$

$$Rc\text{-BLUE}=Rc\text{-BLUE}+(P1-IR)*C3;$$

where C1, C2 and C3 are real numbers, Rc is the reference color and where MIN=0 and MAX=255 for an 8 bit R, G and B.

Various other color models, for example YUV color model, can also be used.

When the second input image is modified by applying the intensity associated with the first pixel to the corresponding pixel of the second input image at step 230, the replacing unit 470 replaces the first pixel with the corresponding pixel of the modified second input image at step 235.

After replacing the first pixel with the corresponding pixel of the modified second input image, the processor 410 performs steps 220, 225, 230 and 235 for each of the plurality of pixels included in the defined area included in the template at step 210. In this way, each of the plurality of pixels is replaced with a corresponding pixel of the modified second input image.

At step 245, the processor 410 displays the second input image inserted in the defined area in the template to the user.

The user can vary properties in real time. For example, the user can scroll through the second input image and the scrolling gets dynamically updated in the display. Various options for editing are also provided for example, rotation, black and white color, contrast, and varying depth.

In one embodiment, a determination is made to check whether the defined area has a mirroring property. A starting location of a mirror is determined and pixels corresponding to the mirror in the first input image are blended with corresponding mirrored pixels of the modified second input image. The degrees of blending are varied based on user requirement. For example, 80% intensity of the corresponding mirrored pixels and 20% of the first input image are taken.

The processor 410 combines the second input image with all the defined areas through steps 220, 225, 230, 235 and 240 to create the combined image at step 245 and displays the image in the display 430.

The output image can be provided in compressed or uncompressed format.

Further, the same second input image or different second input images may be received at different areas.

Figure 3:
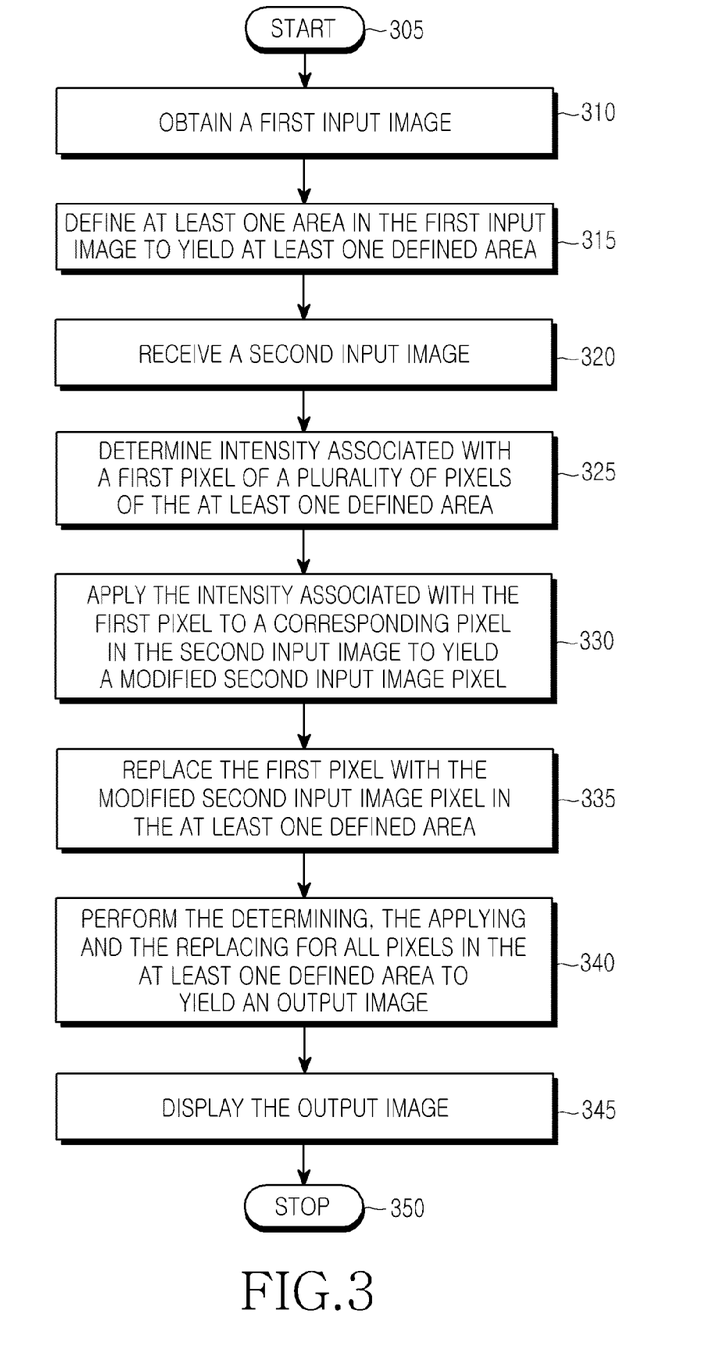
FIG. 3 is a flowchart illustrating a method for creating an output image, in accordance with another embodiment of the invention.

FIG. 3 is a flowchart illustrating a method for creating an output image, in accordance with another embodiment of the present invention.

At step 310, the processor 410 obtains a first input image. The first input image is one of a captured image and a stored image. The first input image can be a compressed image or a non-compressed image.

At step 315, the defining unit 480 defines at least one area in the first input image. Several areas can be defined. The areas are defined in response to an input from a user. The input from the user includes a selection made using a stylus. In some embodiments, an interface is provided to the user in which the user can input the details.

The areas can be of any shape and size. An area defining tool is provided for defining the areas.

At step 320, the processor 410 receives a second input image. The second input image can be a real time image, a captured image, or a stored image. The second input image can be a compressed image or a non-compressed image. The real time image is received from a real time source capable of obtaining the real time image. The real time source can include a camera or a remote device capable of sending the image.

In one embodiment, receiving the second input image includes performing at least one of resizing the second input image, cropping the second input image and repositioning the second input image. The resizing, the cropping and the repositioning of the second input image are performed using various algorithms. For example, the defined area can have a size smaller than the second input image. In such a scenario a central region or any other region of the second input image are selected and altered while maintaining the aspect ratio.

Steps 325, 330, 335 and 340 are performed for each defined area. The processor 410 performs steps 325, 330, 335 and 340 by controlling the identifying unit 475, the determining unit 460, the applying unit 465, and the replacing unit 470.

In the present invention, step 325, 330, 335 and 340 are performed for each pixel in a defined area. The defined area includes the plurality of pixels. Step 325, 330, 335, 340 and 345 for a first pixel of the plurality of pixels of the defined area are explained below.

At step 325, the determining unit 460 determines the intensity associated with the first pixel of the plurality of pixels of the at least one defined area.

As the first scheme for determining the intensity associated with the first pixel, the determining unit 460 computes a mean intensity of the pixels in the area.

$$\text{Mean Intensity } (Im) = \frac{P1 + P2 + P3 + \ldots + PN}{N}$$

Then, the determining unit 460 computes a difference in the intensity of the first pixel and the mean intensity, and defines the difference as the intensity associated with the first pixel.

As the second scheme for determining the intensity associated with the first pixel, the determining unit 460 computes a difference between the intensity of the first pixel and an intensity of a corresponding pixel of the second input image. The difference is defined as the intensity associated with the first pixel. The corresponding pixel is defined as a pixel of the second input image that is intended to be inserted at the place of the first pixel.

After the intensity associated with the first pixel is determined in step 325, the applying unit 465 applies the intensity associated with the first pixel to the corresponding pixel of the second input image to yield a modified second input image pixel at step 330. The applying at step 330 includes varying at least one of intensity, saturation, color and chroma components. The applying is performed based on the needs and requirements of the user.

Various options for the applying step are available to the user, and various techniques of applying can be used. A few exemplary techniques are given below.

When a hue saturation value (HSV) color model is provided according to the first scheme, the values of the corresponding pixel of the second input image are represented as HC, SC, VC and the values of the first pixel are represented as H1, S1, V1. In this case, H1 and HC are equal, SC and S1 are equal and the intensity associated with the first pixel is added to VC. For example, if the mean intensity is "Im", the intensity associated with the first pixel is (Im-P1) is added to VC to make it equal to V1.

When a red green blue (RGB) color model is used according to the second scheme, the difference between the intensity IC of the corresponding pixel of the second input image and the first pixel P1 is determined as the intensity associated with the first pixel. Then, P1−IC is distributed across the RGB color model of the reference color using several distribution ratios. The distribution ratios are selected in a way that each value under each color is between MIN and MAX, for example, each value under each color is between 0 and 255 in an 8 bit R, G and B color model. Exemplary equations for distribution are given below:

$$Rc\text{-RED} = Rc\text{-RED} + (P1-IR)*C1;$$

$$Rc\text{-GREEN} = Rc\text{-GREEN} + (P1-IR)*C2;$$

$$Rc\text{-BLUE} = Rc\text{-BLUE} + (P1-IR)*C3;$$

where C1, C2 and C3 are real numbers, Rc is the reference color and where MIN=0 and MAX=255 for an 8 bit R, G and B.

Various other color models, for example, YUV color model can also be used.

When the second input image is modified by applying the intensity associated with the first pixel to the corresponding pixel of the second input image at step 330, the replacing unit 470 replaces the first pixel with the corresponding pixel of the modified second input image at step 335.

After replacing the first pixel with the corresponding pixel of the modified second input image, the processor 410 performs steps 325, 330 and 335 for each of the plurality of pixels included in the defined area at step 340 to replace each of the plurality of pixels with a corresponding pixel of the modified second input image.

At step 345, the processor 410 displays the second input image inserted in the defined area of the first input image to the user.

The user can vary properties in real time. For example, the user can scroll through the second input image, and the scrolling dynamically updates the display 430. Various options for editing are available, for example, rotation, black and white color, contrast, and varying depth.

Further, a determination is made to check whether the defined area has a mirroring property. To do so, a starting location of a mirror is defined and pixels corresponding to the mirror in the first input image are blended with corresponding mirrored pixels of the modified second input image. The degrees of blending are varied based on user requirement. For example, 80% intensity of the corresponding mirrored pixels and 20% of the first input image are taken.

The processor 410 combines the second input image with all the defined areas through steps 325, 330, 335 and 340 to create the combined image and displays the image in the display 430 at step 345.

The output image can be in compressed or uncompressed format.

Further, the same second input image or different second input images may be received at different areas.

FIG. 4 is a block diagram of an electronic device for creating a template and an image, in accordance with one embodiment. Examples of the electronic device 400 include, but are not limited to, a camera, a computer, a mobile phone, a video telephony device, a camcorder, a television and a personal digital assistant (PDA).

The electronic device 400 includes a bus 405 or other communication mechanism for communicating information. The electronic device 400 includes a processor 410 coupled with the bus 405. The processor 410 comprises an integrated electronic circuit for processing and controlling functionalities of the electronic device 400. The electronic device 400 also includes a memory 415, such as a random access memory (RAM) or other dynamic storage device, coupled to the bus 405 for storing information used by the processor 410. The memory 415 stores any temporary information required.

The electronic device 400 further includes a read only memory (ROM) 420 or other static storage device coupled to the bus 405 for storing static information for the processor 410. A storage unit 425, such as a magnetic disk or optical disk, is provided and coupled to the bus 405 for storing information.

The electronic device 400 is coupled via the bus 405 to a display 430, such as a cathode ray tube (CRT), a liquid crystal display (LCD) or a light emitting diode (LED) display, for displaying information.

An input device 435, including alphanumeric and other keys, is coupled to the bus 405 for communicating an input to the processor 410. The input device 435 can be included in the electronic device 400.

Another type of user input device is a cursor control 440, such as a mouse, a trackball, or cursor direction keys for communicating the input to the processor 410 and for controlling cursor movement on the display 430. The input device 435 can be included in the display 430, for example, a touch screen.

Various embodiments are related to the use of the electronic device 400 for implementing the techniques described herein. In one embodiment, the techniques are performed by the processor 410 using information included in the memory 415. The information is read into the memory 415 from another machine-readable medium, such as the storage unit 425.

The term "machine-readable medium" as used herein refers to any medium that participates in providing data that causes a machine to operate in a specific fashion. In an embodiment implemented using the electronic device 400, various machine-readable medium are involved, for example, in providing information to the processor 410. The machine-readable medium can be a storage media. Storage media as used herein includes both nonvolatile media and volatile media. Non-volatile media includes, for example, optical or magnetic disks, such as the storage unit 425. Volatile media includes dynamic memory, such as the memory 415. All such media are tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge.

In another embodiment, the machine-readable medium comprises a transmission media including coaxial cables, copper wire and fiber optics, including the wires that include the bus 405. Transmission media can take the form of acoustic or light waves, such as those generated during radio-wave and infra-red data communications.

The electronic device 400 also includes a communication interface 445 coupled to the bus 405. The communication interface 445 provides a two-way data communication coupling to a network 450. Examples of the network include but are not limited to one of a wireless communication networks, for example Internet, Bluetooth network, ZigBee network, infrared network, local area network (LAN), etc.

The communication interface 445 can be a LAN card to provide a data communication connection to a compatible LAN. Wireless links, for example Bluetooth, can also be implemented. In any such implementation, communication interface 445 sends and receives electrical, electromagnetic or optical signals that carry digital data streams representing various types of information. The communication interface 445 can be a universal serial bus port.

In one embodiment, a remote device 490 is connected to the network 450. The remote device 490 sends at least one image from a remote location over the network 450. Examples of the remote device include but are not limited to a camera, a computer, a mobile phone and a video telephony device.

In some embodiments, the electronic device 400 is connected to the storage device 455 for storing or fetching information. Examples of the storage device 455 includes, but are not limited to, a flash drive, a pen drive, a hard disk or any other storage media. The storage device is used to store one or more reference images, one or more output images, and information related to pixel intensities of a reference color added to a visual region on a reference image.

In one embodiment, the electronic device 400 includes or is connected to one or more processing units, for example, a determining unit 460, an applying unit 465, a replacing unit 470, an identifying unit 475, a defining unit 480 and a camera 485.

In one embodiment an input image is received by the electronic device 400 for creating a template. The receiving of the input image is from one of a real time images captured in the camera 485, a stored image, a downloaded image and an edited image.

The defining unit 480 defines at least one area in an input image in response to an input from a user to yield at least one defined area.

The determining unit 460 determines intensity associated with a plurality of pixels in at least one area.

The applying unit 465 applies an intensity associated with plurality of pixels to a plurality of reference color pixels to yield a modified plurality of reference colored pixels.

The replacing unit 470 replaces the plurality of pixels with the plurality of modified reference color pixels. The determining unit, the applying unit and the replacing unit perform the determining, the applying and the replacing for the plurality of pixels in the at least one area to create the template.

The identifying unit 475 identifies a plurality of pixels of the at least one defined area having a hue equal to that of a reference color.

The determining unit 460 further determines an intensity associated with the plurality of pixels.

The applying unit 465 further applies the intensity associated with the plurality of pixels to a corresponding plurality of pixels in the second input image to yield modified second input image pixels.

The replacing unit 470 further replaces the plurality of pixels with the modified second input image pixels in the at least one defined area wherein the identifying unit, the determining unit, the applying unit and the replacing unit perform the identifying, the determining, the applying and the replacing for the plurality of pixels in the at least one area to yield the output image. The display 430 displays the output image.

In another embodiment, for creating an output image, the bus 405 obtains a first input image and a second input image. The defining unit 480 defines at least one area in the first input image to yield at least one defined area.

The determining unit 460 determines an intensity associated with a plurality of pixels of the at least one defined area.

The applying unit 465 applies the intensity associated with the plurality of pixels to a corresponding plurality of pixels in the second input image to yield a modified second input image pixels.

The replacing unit 470 replaces the plurality of pixels with the modified second input image pixels in the at least one defined area, wherein the determining unit, the applying unit and the replacing unit performs the determining, the applying and the replacing for the plurality of pixels in the at least one area to yield the output image.

The display 430 displays the output image. The storage unit 425 stores at least one of the template, the output image, reference color, the first input image, the second input image, information associated with the at least one defined area and mirroring information associated with at least one defined area.

In some embodiments, the processor performs the functions of the processing units.

Figure 5A:
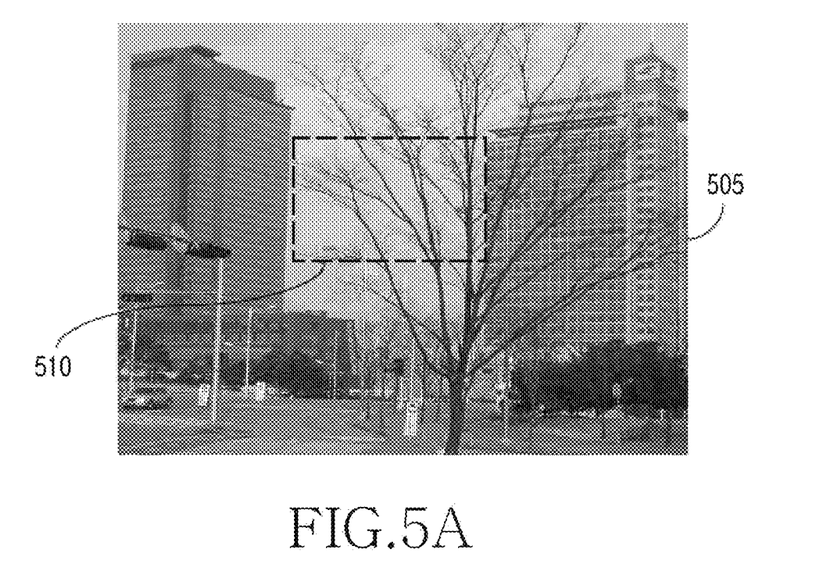
FIGS. 5*a* to 5*c* are an exemplary representation of an input image for creating a template, an exemplary created template, and exemplary output image in the created template, in accordance with one embodiment of the invention.
Figure 5B:
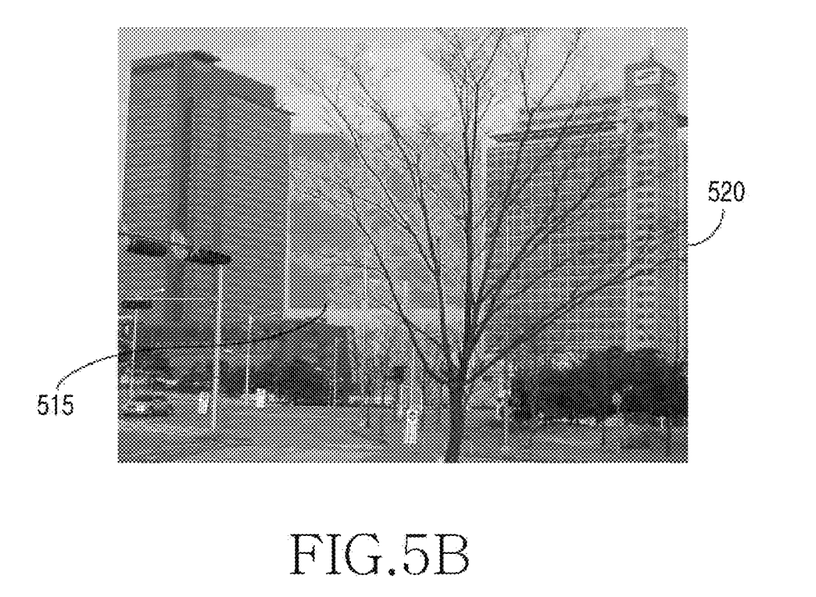
Figure 5C:
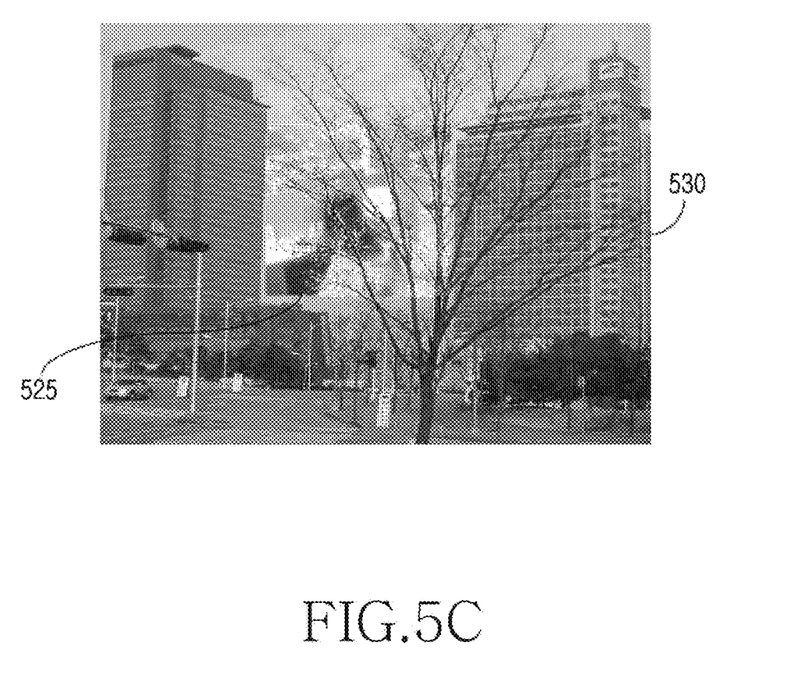

FIG. 5a to FIG. 5c are exemplary representations of an input image, a template image and a created output image, in accordance with one embodiment.

When an area 510 is defined on an input image obtained by the user by the defining unit 480 as shown in FIG. 5a, the determining unit 460 determines an intensity associated with a first pixel of a plurality of pixels in the defined area. Further, the applying unit 465 applies the intensity associated with the first pixel to a reference color pixel to yield a modified reference color pixel. The replacing unit 470 replaces the first pixel with the modified reference color pixel.

Further, the processor 410 detects edges in the defined area. For example, the branches of a tree depicted in the defined area 510 are identified as edges and retained as indicated by 515 in FIG. 5b.

The determining, the applying and the replacing operations are performed for the plurality of pixels in the defined area, thereby creating the template 520 as illustrated in the FIG. 5b.

When the template is obtained by the user and a second input image 525 is received as shown in FIG. 5c, the identifying unit 475 identifies a first pixel of the defined area having a hue equal to that of a reference color. The intensity associated with the first pixel is determined by the determining unit 460 and is applied to a corresponding pixel in the second input image 520 by the applying unit 465 to yield a modified second input image pixel. The first pixel is replaced with the modified second input image pixel in the defined area by the replacing unit 470. The identifying, the determining, the applying and the replacing are performed for the plurality of pixels in the defined area to yield the output image 530, as illustrated in FIG. 5c.

Figure 6A:
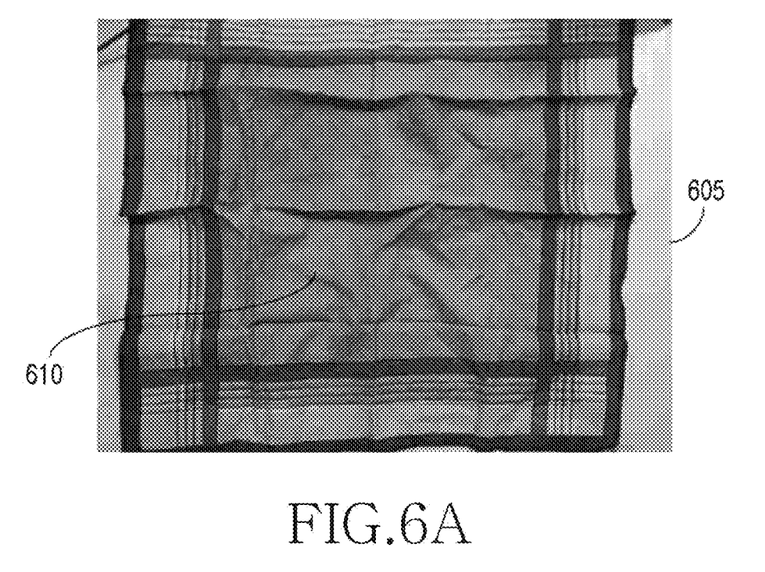
FIGS. 6*a* and 6*b* are an exemplary representation of an input image and exemplary representation of the output image, in accordance with one embodiment of the invention.
Figure 6B:
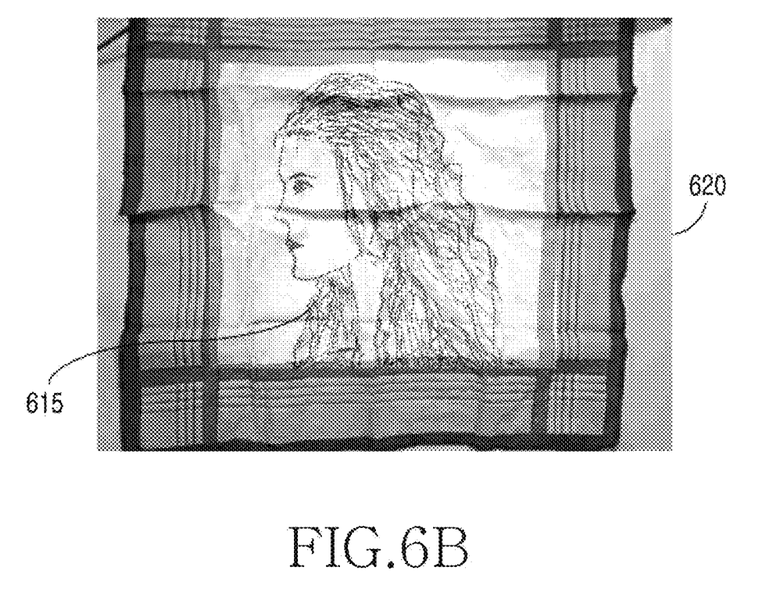

FIG. 6a and FIG. 6b are exemplary representations of an input image, a created and output image, in accordance with one embodiment of the invention.

When a first input image 605 is obtained as shown in FIG. 6a, the defining unit 480 defines at least one area 610 in the first input image 605. Further, when a second input image 615 is received, the determining unit 460 determines an intensity associated with a first pixel of a plurality of pixels of the defined area by a color model, for example, the HSV color model. Further, the applying unit 465 applies the intensity associated with the first pixel (V) to a corresponding pixel in the second input image 615 to yield a modified second input image pixel. Then, the replacing unit 470 replaces the first pixel with the modified second input image pixel in the defined area.

The determining, the applying and the replacing are performed for all pixels in the defined area to yield the output image 620. The edges in the image are not determined.

The output image 620 is displayed to the user as shown in FIG. 6b.

Figure 7A:
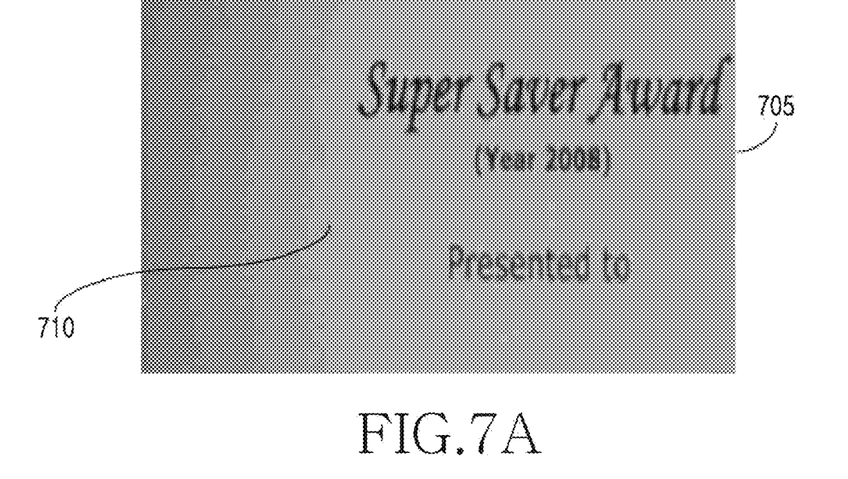
FIG. 7*a* and FIG. 7*b* are an exemplary representation of an input image and an output image in accordance with another embodiment of the invention.
Figure 7B:
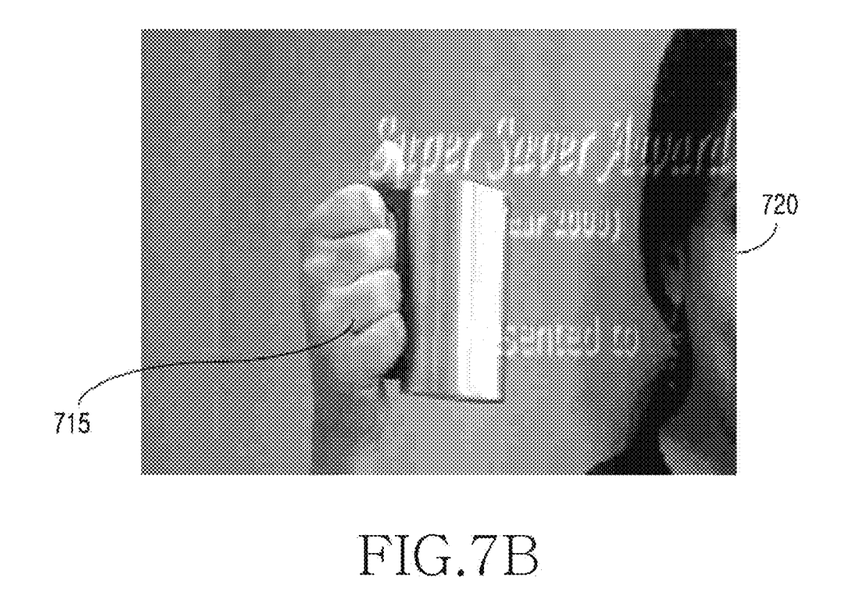

FIG. 7a and FIG. 7b are exemplary representations of an input image and an output image created in accordance with another embodiment of the invention.

As shown in FIG. 7a, when a first input image 705 is obtained, the defining unit 480 defines at least one area 710 in the first input image.

Further, when a second input image 715 is received, the determining unit 460 determines the intensity associated with a first pixel of a plurality of pixels of the defined area. The applying unit 465 applies the intensity associated with the first pixel to a corresponding pixel in the second input image 715 to yield a modified second input image pixel.

Also, the determining unit 460 determines the intensity associated with a first pixel of a plurality of pixels of the defined area by a color model, for example, the RGB color model. The replacing unit 470 replaces the first pixel with the modified second input image pixel in the defined area 710. The determining, the applying and the replacing are performed for all pixels in the defined area to yield the output image 720.

The edges in the at least one area are determined and the pixel intensities of the edges are varied. The output image 720 is displayed to the user as illustrated in FIG. 7b.

By a method and a system for creating an image according to the present invention, it is possible to provide a realistic effect in outputting a combination of at least two images. Further, it is possible to reduce the processing time in combining the combined at least two images and to reduce a storage space for storing the combined at least two images.

In the preceding specification and drawings referenced, the invention and its advantages have been described with reference to specific embodiments. However, it will be apparent to a person of ordinary skill in the art that various modifications and changes can be made to these embodiments without departing from the scope and spirit of the invention, as set forth in the claims below.

What is claimed is:

1. A method of creating an image, operable in a processor of an electronic device, the method comprising:
    creating a template comprising a portion of a first input image having at least one defined area;
    receiving a second input image;
    modifying the second input image by applying a plurality of intensities associated with a respective plurality of pixels included in said at least one defined area of the template directly to a corresponding plurality of pixels included in the second input image,
    replacing said at least one defined area of the template with the modified second input image thereby creating an output image; and
    displaying the output image,
    wherein the template is created by applying an intensity relating to a first pixel from among the plurality of pixels included in said at least one defined area to a reference color pixel.

2. The method of claim 1, wherein the step of creating the template comprises:
    defining said at least one defined area in the first input image in response to an input from a user;
    replacing the first pixel with the modified reference color pixel; and
    repeatedly performing the determining, applying and replacing for the plurality of pixels included in said at least one defined area.

3. The method of claim 2, further comprising the step of storing the template.

4. The method of claim 3, wherein the step of storing comprises:
    storing a reference color; and
    storing information relating to said at least one defined area.

5. The method of claim 2, further comprising:
    determining edge pixels in said at least one defined area; and
    preserving the determined edge pixels in said at least one defined area.

6. The method of claim 2, further comprising:
    determining a presence of mirroring in said at least one defined area; and storing mirror information relating to said at least one defined area.

7. The method of claim 2, wherein the determining comprises:
    computing a mean intensity of the plurality of pixels included in said at least one defined area;
    computing a difference between the mean intensity and an intensity of the first pixel; and
    defining the difference as the intensity relating to the first pixel.

8. The method of claim 2, wherein the determining comprises:
    computing a difference between an intensity of the first pixel and an intensity of a corresponding reference color pixel; and
    defining the difference as the intensity relating to the first pixel.

9. The method of claim 2, wherein the reference color of the reference color pixel is pre-defined.

10. The method of claim 2, wherein the applying comprises varying at least one property in the reference color pixel, and said at least one property comprises at least one of intensity, saturation, color and chroma components.

11. The method of claim 1, wherein creating the output image comprises:
    identifying the first pixel having a hue equal to that of the reference color from among the plurality of pixels included in said at least one defined area;
    replacing the first pixel with the modified second image pixel in said at least one defined area; and
    repeatedly performing the determining, applying and replacing for the plurality of pixels included in said at least one defined area.

12. A system for creating an image, comprising:
    a defining unit for defining at least one defined area in a portion of the area of a template;
    a determining unit for determining an intensity relating to a first pixel of the template from among the plurality of pixels included in said at least one defined area of the template;
    an applying unit for applying the intensity relating to the first pixel directly to a corresponding pixel of a second input image, to compute a modified second input image pixel;

a replacing unit for replacing the first pixel with the modified second input image pixel in said at least one defined area of the template;

a processor for identifying and repeatedly performing the determining, the applying and the replacing for each of the plurality of pixels included in said at least one defined area through the determining unit, the applying unit and the replacing unit to create the output image; and the applying unit applies the intensity relating to the first pixel to a reference color pixel, thereby computing a modified reference color pixel;

the replacing unit replaces the first pixel with the modified reference color pixel to create the template.

13. The system of claim 12, further comprising an identifying unit for identifying a first pixel having a hue equal to that of a reference color from among the plurality of pixels included in said at least one defined area.

14. The system of claim 12, wherein the determining unit defines a difference between a mean intensity of the plurality of pixels included in said at least one defined area and an intensity of the first pixel or a difference between the intensity of the first pixel and an intensity of a corresponding pixel of the second input image as the intensity relating to the first pixel.

15. The system of claim 12, wherein the applying unit changes at least one property in the reference color pixel, and wherein said at least one property comprises at least one of intensity, saturation, color and chroma components.

16. The system of claim 12, wherein the processor checks whether said at least one defined area has a mirroring property, determines a starting location of a mirror, blends pixels corresponding to a mirror of the first input image with corresponding mirrored pixels of the modified second input image and changes degrees of the blending.

17. The system of claim 12, wherein the reference color of the reference color pixel is predefined.

18. The system of claim 12, wherein the determining unit determines an intensity relating to a first pixel from among the plurality of pixels included in said at least one defined area;

the processor identifies and repeatedly performs the determining, the applying and the replacing of each of the plurality of pixels included in said at least one defined area through the determining unit, the applying unit and the replacing unit to create the template.

19. The system of claim 18, wherein the determining unit defines a difference between a mean intensity of the plurality of pixels included in said at least one defined area and an intensity of the first pixel or a difference between the intensity of the first pixel and an intensity of a corresponding pixel of the second input image as the intensity relating to the first pixel.

20. The system of claim 18, wherein the processor determines edge pixels in said at least one defined area, and preserves the determined edge pixels in said at least one defined area.

21. The system of claim 18, wherein the processor determines a presence of mirroring in said at least one defined area, and stores mirror information relating to said at least one defined area.

22. The system of claim 12, wherein the applying unit changes at least one property in the reference color pixel, and wherein said at least one property comprises at least one of intensity, saturation, color and chroma components.

23. The system of claim 12, further comprising a storage unit for storing the template, the output image, the reference color, the first input image, the second input image, at least one of information relating to said at least one defined area and mirror information relating to said at least one defined area.

* * * * *